(12) United States Patent
Mironets et al.

(10) Patent No.: US 9,140,130 B2
(45) Date of Patent: Sep. 22, 2015

(54) LEADING EDGE PROTECTION AND METHOD OF MAKING

(75) Inventors: Sergey Mironets, Norfolk, CT (US);
Aaron T. Nardi, East Granby, CT (US)

(73) Assignee: United Technologies Corporation, Hartford, CT (US)

(*) Notice: Subject to any disclaimer, the term of this patent is extended or adjusted under 35 U.S.C. 154(b) by 840 days.

(21) Appl. No.: 13/414,828

(22) Filed: Mar. 8, 2012

(65) Prior Publication Data
US 2013/0236323 A1  Sep. 12, 2013

(51) Int. Cl.
| F01D 5/14 | (2006.01) |
| F01D 5/28 | (2006.01) |
| B22F 5/04 | (2006.01) |
| B22F 7/06 | (2006.01) |
| C23C 24/04 | (2006.01) |
| B64D 45/00 | (2006.01) |

(52) U.S. Cl.
CPC . *F01D 5/286* (2013.01); *B22F 5/04* (2013.01); *B22F 7/06* (2013.01); *C23C 24/04* (2013.01); *B64D 2045/009* (2013.01); *Y10T 29/49316* (2015.01)

(58) Field of Classification Search
CPC ..... F01D 5/286; B64D 2045/009; B22F 7/06; B22F 5/04; C23C 24/04
USPC .................... 416/224, 241 R, 241 A; 29/598, 29/889.7–889.72
See application file for complete search history.

(56) References Cited

U.S. PATENT DOCUMENTS

| 4,010,530 | A | | 3/1977 | Delgrosso et al. |
| 4,664,600 | A | | 5/1987 | Perry |
| 5,137,426 | A | | 8/1992 | Rhoda |
| 5,908,285 | A | * | 6/1999 | Graff ............................ 416/224 |
| 7,186,092 | B2 | * | 3/2007 | Bruce et al. ............... 416/241 R |
| 8,088,498 | B2 | | 1/2012 | Smith et al. |
| 8,764,959 | B2 | * | 7/2014 | Smith et al. ..................... 205/73 |
| 2004/0062655 | A1 | | 4/2004 | Potter et al. |
| 2009/0038739 | A1 | * | 2/2009 | Holland et al. ................ 156/98 |
| 2009/0324413 | A1 | | 12/2009 | Streng et al. |
| 2011/0078896 | A1 | * | 4/2011 | Calla et al. ...................... 29/598 |
| 2011/0097213 | A1 | * | 4/2011 | Peretti et al. ............. 416/241 A |
| 2011/0129351 | A1 | * | 6/2011 | Das et al. .................. 416/241 A |
| 2011/0129600 | A1 | | 6/2011 | Das et al. |
| 2011/0182740 | A1 | | 7/2011 | Klinetob et al. |
| 2011/0194941 | A1 | | 8/2011 | Parkin et al. |
| 2011/0211967 | A1 | | 9/2011 | Deal et al. |
| 2013/0199934 | A1 | * | 8/2013 | Parkos et al. ................... 205/50 |

OTHER PUBLICATIONS

International Search Report dated Nov. 22, 2013, for International Application No. PCT/US2013/026663.
International Preliminary Report on Patentability dated Sep. 9, 2014, for PCT/US2013/026663.

* cited by examiner

*Primary Examiner* — Nathaniel Wiehe
*Assistant Examiner* — Woody A Lee, Jr.
(74) *Attorney, Agent, or Firm* — Kinney & Lange, P.A.

(57) ABSTRACT

A method of forming a leading edge protection component includes depositing particles using a cold spray process on a mandrel to form a leading edge protection component; and removing the leading edge protection structure from the mandrel. The leading edge protection can be formed in one or more pieces and involve using one or more mandrels.

16 Claims, 6 Drawing Sheets

LEADING EDGE PROTECTION AND METHOD OF MAKING

BACKGROUND

In order to prevent damage from the impact of foreign objects such as birds or reduce or prevent erosion, a metallic sheath has been used to protect the leading edges of fan blades, rotor blades, and propellers. Materials such as titanium, steel, nickel and their alloys have been fitted on the leading edge of the element to be protected.

Sheaths can be formed and attached to an airfoil in various ways. For example, sheaths can be machined from metal and then bonded to the leading edge of an airfoil with adhesive, heat and pressure. Other methods of manufacturing a sheath include electroforming and powder laser deposition.

SUMMARY

A method of forming a leading edge protection includes forming leading edge protection by depositing material using a cold spray process on a first mandrel; and removing the leading edge protection from the first mandrel.

A sheath for an airfoil with a leading edge, a trailing edge, a suction side and a pressure side includes a central portion to attach to the leading edge; first and second flanks to attach to the suction and pressure sides of the airfoil, wherein the sheath has been formed by a cold spray process onto a mandrel.

DETAILED DESCRIPTION

Figure 1:
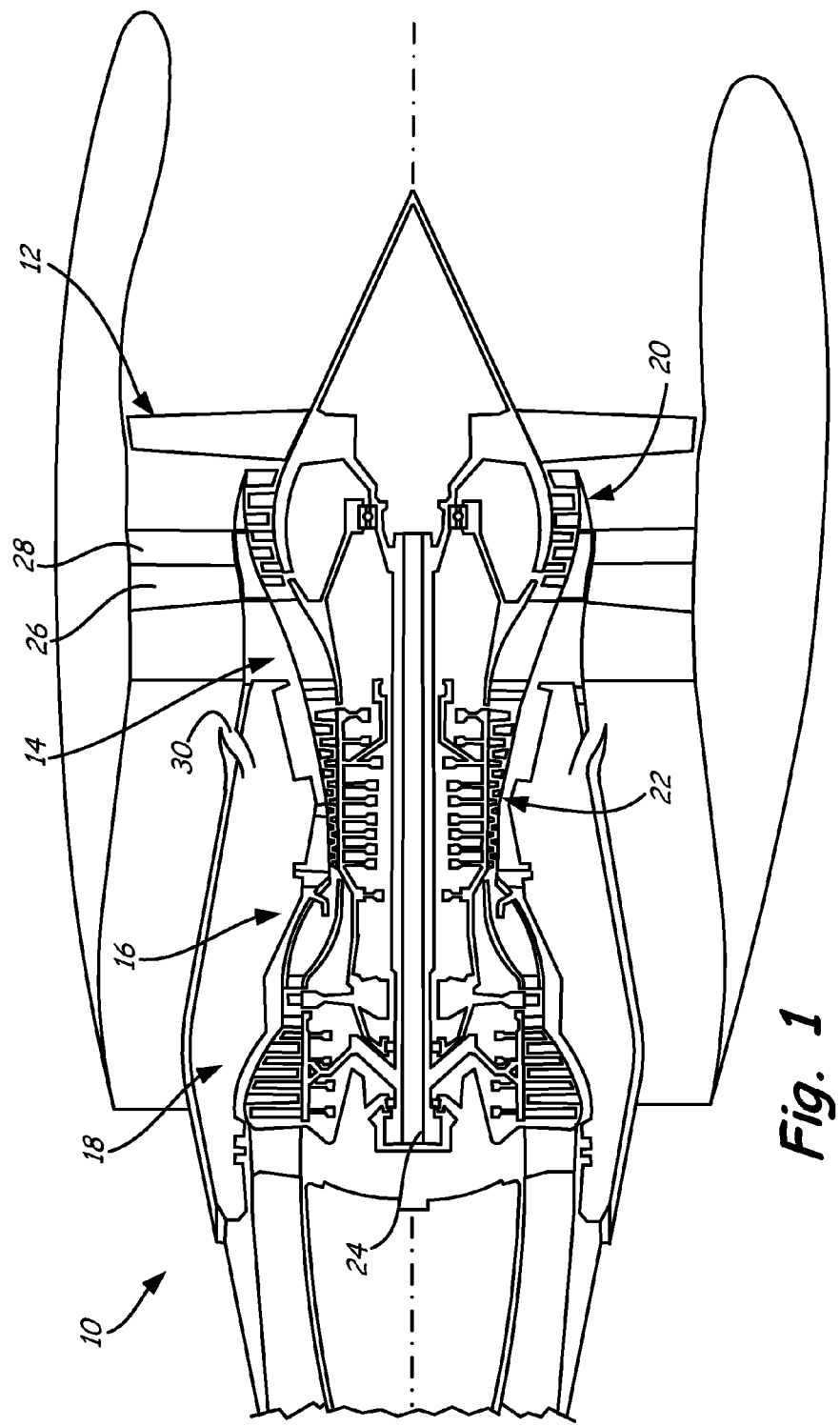
FIG. 1 is a cross-sectional view of a gas turbine engine.

FIG. 1 is a cross-sectional view of gas turbine engine 10, which includes turbofan 12, fan case 13, compressor section 14, combustion section 16 and turbine section 18. Compressor section 14 includes low-pressure compressor 20 and high-pressure compressor 22. Air is taken in through fan 12 as fan 12 spins in fan case 13. A portion of the inlet air is directed to compressor section 14 where it is compressed by a series of rotating blades and vanes. The compressed air is mixed with fuel, and then ignited in combustor section 16. The combustion exhaust is directed to turbine section 18. Blades and vanes in turbine section 18 extract kinetic energy from the exhaust to turn shaft 24 and provide power output for engine 10.

The portion of inlet air which is taken in through fan 12 and not directed through compressor section 14 is bypass air. Bypass air is directed through bypass duct 26 by guide vanes 28. Some of the bypass air flows through opening 29 to cool combustor section 16, high pressure compressor 22 and turbine section 18. Fan 12 includes a plurality of blades 30 which spin in fan case 13.

Figure 2A:
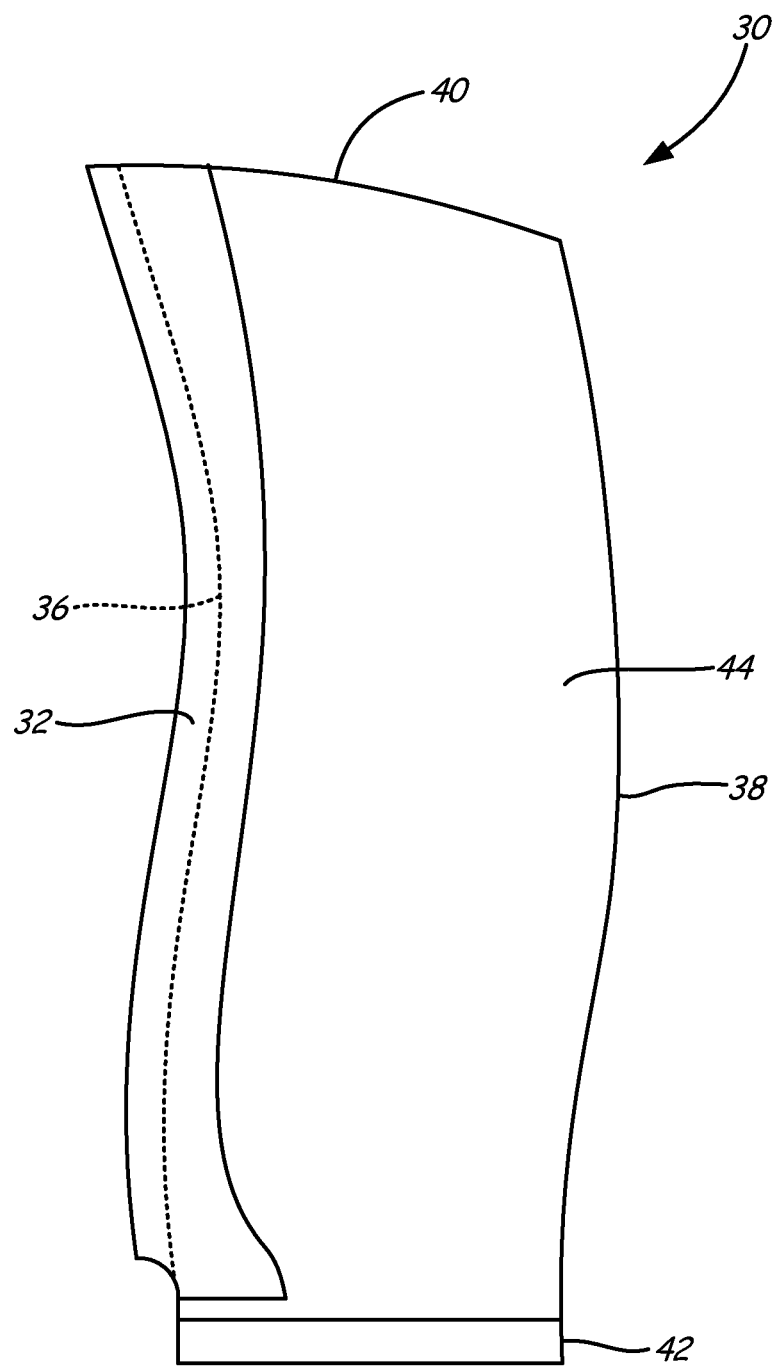
FIG. 2A is a side view of a blade with a sheath.
Figure 2B:
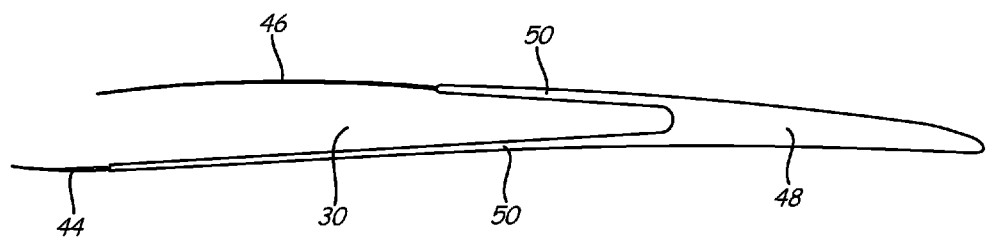
FIG. 2B is a cross-sectional view of the blade with sheath of FIG. 2A.
Figure 2C:
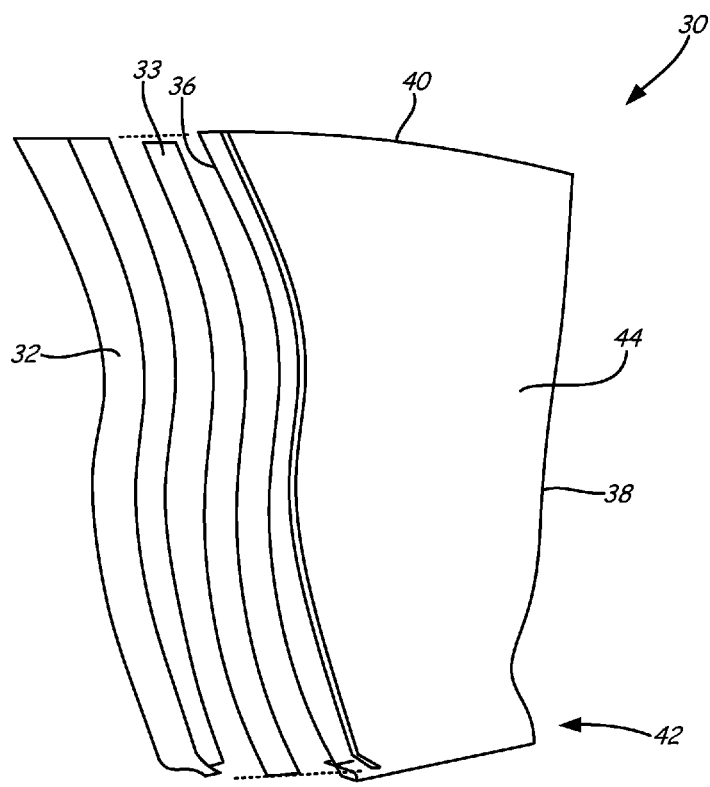
FIG. 2C is an exploded view of the blade and sheath of FIG. 2A.

FIG. 2A is a side view of blade 30 with sheath 32, FIG. 2B is a cross-sectional view of FIG. 2A, and FIG. 2C is an exploded view of FIG. 2A. FIGS. 2A-2C include blade 30 with airfoil 34 with leading edge 36, trailing edge 38, tip 40, root 42, suction side 44 and pressure side 46; sheath 32 and skrim sheet 33. Sheath 32 includes solid portion 48 covering leading edge 36 with and tapered flanks 50 extending from each side of solid portion 48 to connect to suction side 44 and pressure side 46 of airfoil 34.

Sheath 32 covers leading edge 36 of airfoil 34 with solid portion 48 by adhesively bonding flanks 50 to suction side 44 and pressure side 46 of airfoil 34 with skrim sheet 33 between sheath 32 and airfoil 34. Flanks 50 can be bonded to suction side 44 and pressure side 46 with various adhesives including, but not limited to, rubber, silicone or epoxy resin. Skrim sheet 33 can be a thin piece of cloth which provides a separation between the different materials of sheath 32 and airfoil 34, protecting blade 30 from its susceptibility to galvanic corrosion where sheath 32 is bonded to airfoil 34.

Sheath 32 can be made of titanium, aluminum, nickel, or iron (including alloys of any) or other materials with sufficient stiffness, strength and erosion resistance to withstand the impact loads, static and fatigue loads, or sand and rain erosion that may be experienced on the leading edge of an airfoil. The length of solid portion 48 (extending out from leading edge 36 and from tip 40) can vary widely, but must be sufficiently long to provide protection for leading edge 36 of blade 30. The length of flanks 50 can be varied on each side of airfoil 34 depending on requirements of blade 30 and sheath 32. In the example shown, flank 50 on pressure side extends further in the chordwise direction to provide extra large scale impact protection, for example, from a birdstrike, in portions of airfoil 34 where blade 30 is most vulnerable to strike.

Sheath 32 provides extra strength and stiffness to blade 30, allowing blade 30 to be made of lightweight materials, and still maintain optimal performance and levels of aerodynamic efficiency under impact loading similar to the levels of prior art blades. Solid portion 48 of sheath 32 provides a layer of protection from impact loads as well as erosion for leading edge 36 of airfoil. Tapered flanks 50 bond solid portion 48 to airfoil to hold solid portion 48 in place. Additionally, leading edge 36 of solid portion 48 can be coated with a thin layer of erosion resistant coating to provide increased erosion resistance. This coating may be a cermet, for example, WC or Cr2C2 containing material, or a harder metallic material such as nick or cobalt based hard alloys. Tapered flanks 50 further provide extra stiffness to airfoil 48 and more surface area for a smooth load transfer during impacts to blade 30.

Figure 3A:
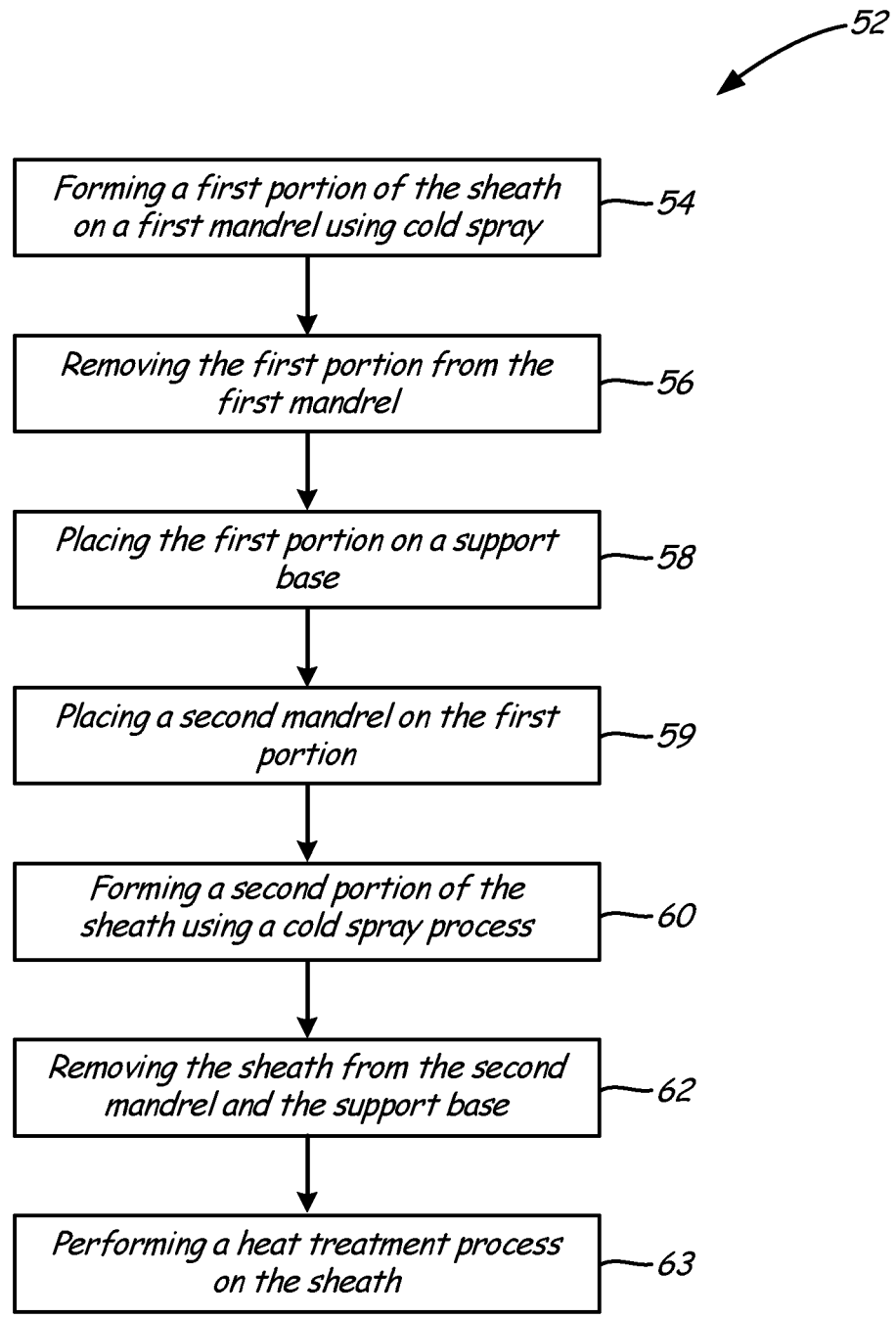
FIG. 3A is a block diagram illustrating a method of forming the sheath of FIGS. 2A-2C
Figure 3B:
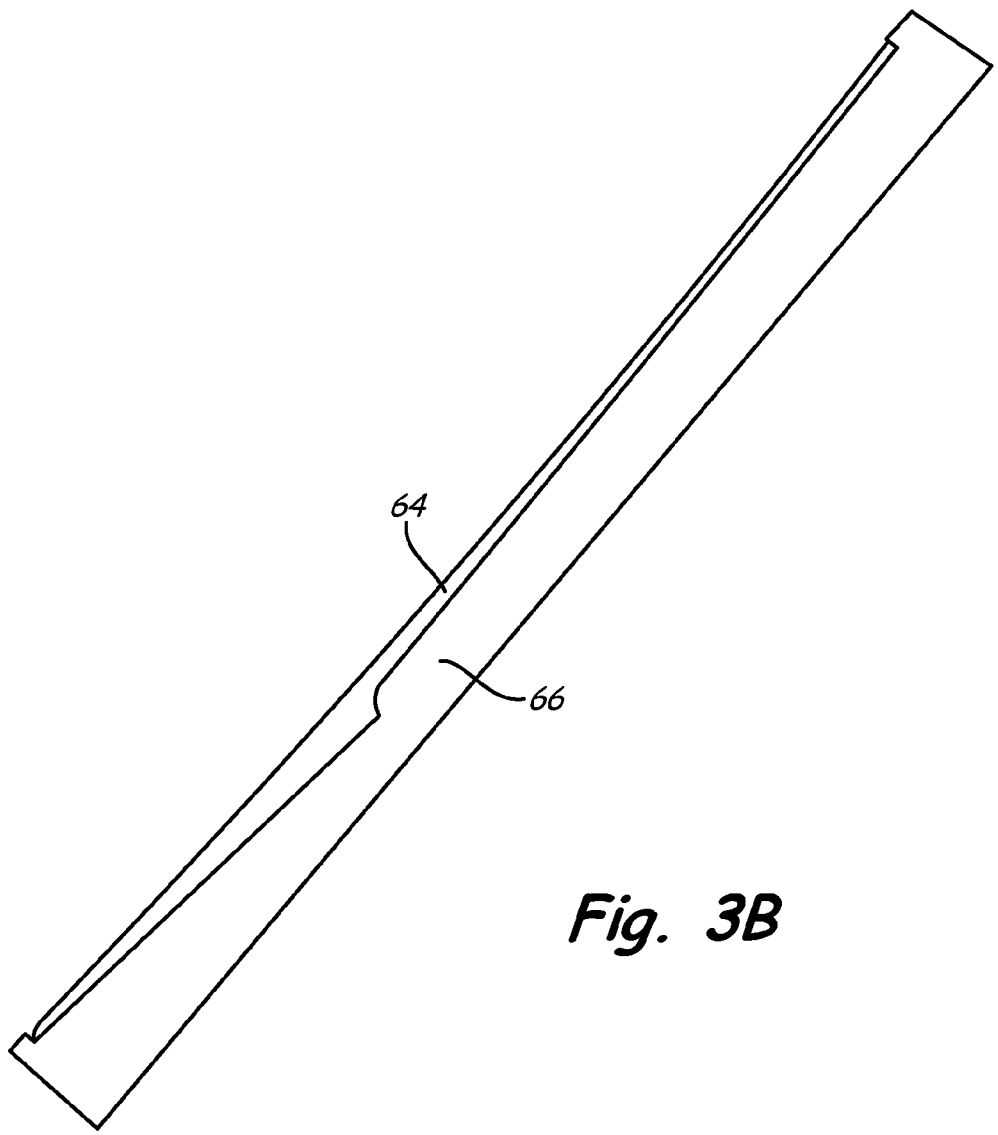
FIG. 3B is a cross sectional view of a first mandrel and a portion for a sheath.
Figure 3C:
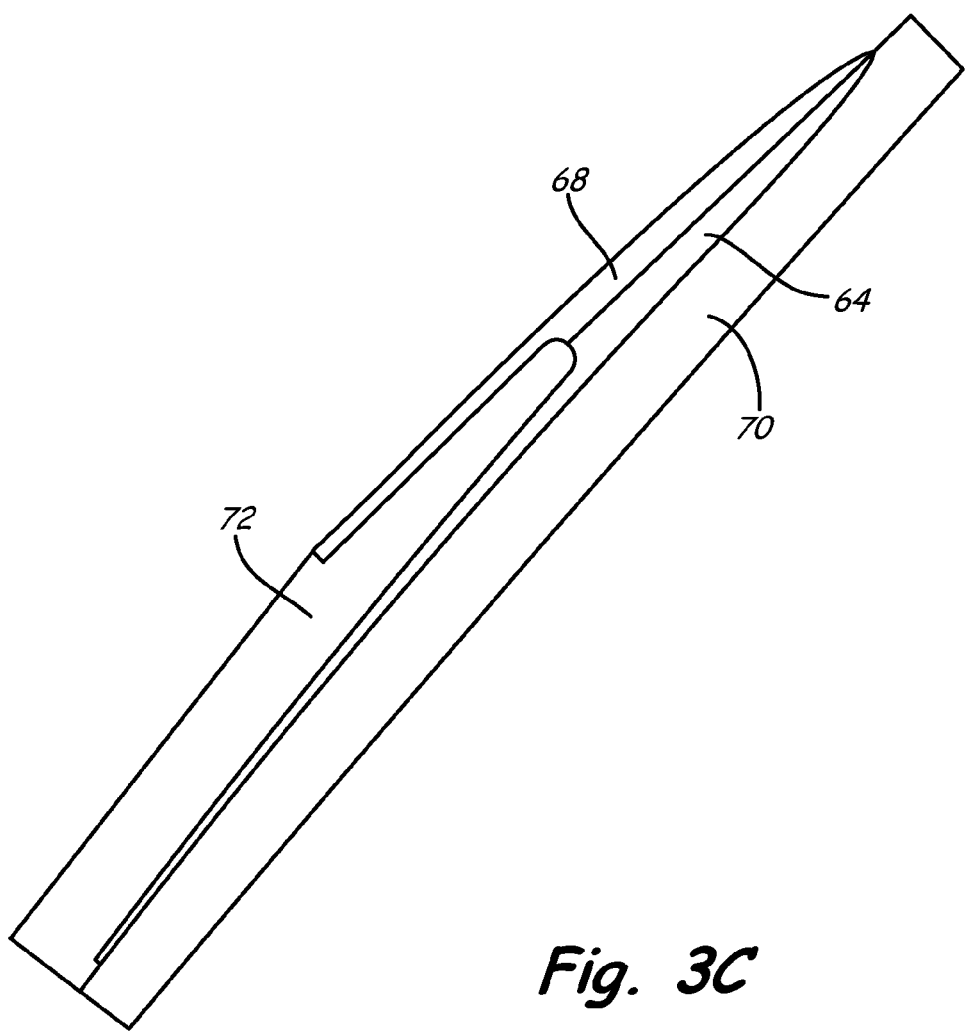
FIG. 3C is a cross sectional view of a second mandrel, a support base and a sheath.

FIG. 3A is a block diagram illustrating method 52 of forming the sheath 32, and includes the steps of: forming a first portion of the sheath on a first mandrel using a cold spray process (step 54), removing the first portion from the first mandrel (step 56), placing the first portion on a support base (step 58), placing a second mandrel on the first portion (step 59), forming a second portion of the sheath using a cold spray process (step 60), removing the sheath from the second mandrel and the support base (step 62) and performing a heat-treatment process on the sheath (step 63). FIG. 3B shows first portion 64 of sheath 32 on first mandrel 66, and FIG. 3C shown sheath 32 with first portion 64 and second portion 68 on support base 70 and second mandrel 72.

Forming first portion 64 of sheath 62 on first mandrel 66 using a cold spray process (step 54) involves using a first mandrel 66 (FIG. 4A) shaped so that the cold spray process can form first portion 64 in the shape desired. In the example shown in FIG. 3B, leading edge sheath 32 is being made for an airfoil 34 (See FIGS. 2A-2C), so first mandrel 66 is shaped to mimic airfoil 34 and second portion 68 of sheath 32. First portion 64 is formed on first mandrel 66 using a cold spray process. In this example, first portion 64 is the pressure side of sheath 62.

A suitable cold spray process can involve using powdered metal or cermet particles and a cold spray apparatus to accelerate the powdered particles at very high velocities toward first mandrel 66 with a fluid. The fluid is generally a gaseous fluid such as nitrogen or helium. As the particles hit first mandrel 66, they plastically deform locally so that the particles and first mandrel 66 can bond together. After particles have built a layer on first mandrel 66, new particles deform on the surface they hit and bond to that, building up the thickness of first portion 64. This process of plastic deformation is facilitated by a process which can accelerate particles to velocities in the range of about 300 to about 1500 meters/second. This is achieved by accelerating a fluid to velocities generally higher than those desired from the particles, and then allowing the particles to drag in the fluid flow. Temperatures of the fluid used to propel the particles in the spray device are kept between about 20 degrees Celsius to about 1000 degrees Celsius. The temperature is selected to ensure the materials used stay in a solid state to allow proper deformation and bonding. This temperature is also adjusted to increase the gas velocity sufficiently high to propel the powder materials at a velocity that can form a very dense deposit. Although most gases or fluids have the potential for accelerating particles sufficiently high, the typical gases for a cold spray process include inert and semi-inert gases, for example, nitrogen and helium, although one skilled in the art may use alternate fluids to accelerate the particles.

Removing the first portion from the first mandrel (step 56) can be performed in a variety of ways. One example can involve having a thin release layer of material on the surface first mandrel 66 of a material that melts at a lower temperature than both first mandrel 66 and the material used to form sheath 32. First mandrel 66 and first portion 64 of sheath 32 can then be heated up until the surface release layer melts, releasing first portion 64 from first mandrel 66.

Placing the first portion on a support base (step 58) and placing second mandrel 70 on first portion 66 (step 59) are done using suitable support base and a second mandrel. In the example shown in FIG. 3C, second mandrel 72 is shaped like the leading edge of airfoil 34, and support base 70 is shaped to support the outside edge of first portion 66. Placing second mandrel 70 on first portion 66 serves two functions: it provides a base for building up second portion 68 of sheath 32 and shields first portion 66 from the cold spray process used in forming second portion 68.

Forming second portion 68 of sheath 32 using a cold spray process (step 60), and removing sheath 32 from second mandrel 72 and support base 70 (step 62) can be performed in the same way as described above in relation to steps 54 and 56 (cold spray process, then heating up a surface release layer to remove). In some embodiments, second portion 68 can be formed using different materials than first portion 66. For example, first portion 66 can be formed with particles of material that his high strength and impact resistance properties and second portion 68 can be formed from particles of material with high hardness and erosion resistance properties, such as a carbide containing material or a harder metal alloy. This can be beneficial in giving sheath 32 a harder leading edge surface for improved erosion resistance where it is most susceptible to strike and erosion.

Performing a heat-treatment process on sheath 32 (step 61) can be done by placing sheath 32 in a heated solution to help diffusion bond sheath 32 together and improve the microstructure of sheath 32.

By forming sheath 32 with a cold spray process using first mandrel 66, second mandrel 72 and support base 70, sheath 32 is formed to be very dense and strong, while still being able to go through any finishing processes or treatments desired after being made. Some past systems used a cold spray process to form a sheath directly onto a blade. This resulted in issues with galvanic corrosion where the different material of the sheath was sprayed directly onto the blade and prevented any heat-treatment processing of the blade due to the lower heat resistance of the materials lightweight airfoils are typically made of (for example, aluminum).

By forming sheath 32 on mandrels 66 and 72, sheath 32 can benefit from improved strength properties of using a cold spray process while still allowing heat-treatment processes to further improve material properties of sheath 32. Cold spray operates in temperatures below the melting point of the particles used, resulting in very low distortion due to thermal stresses. Cold spray process solid state mechanical bonding as a result of high velocity impact and plastic deformation of particles provides for the formation of high-density crack free structures, resulting in a very homogenous and strong sheath 32. The density of structures formed from the cold spray process is higher than the density if formed from similar materials using a different process. Forming sheath 32 on mandrels 66, 72 also eliminates the galvanic corrosion problems associated with forming sheath 32 directly onto airfoil 34. Sheath can then be bonded to airfoil 34 with a skrim sheet to further prevent galvanic corrosion issues (see FIG. 2C).

The same process can be used to produce a sheath 32 where solid portion 48 has a thickness on the same order as the thickness of tapered flanks 50. In another embodiment, the thickness of solid portion 48 can be between two and five times the thickness of flanks 50.

Additionally, method 52 provides an efficient and easy way to manufacture sheath 32 as compared to other past manufacturing processes. Cold spray processes can have a much higher deposition rate and fewer steps than laser power deposition processes used in making some past sheaths. Cold spray processes also make it easier to form the complicated shapes involved for leading edge protection as compared to complicated and expensive machining processes. Forming sheath 32 in a first portion 64 and second portion 68 allows for ease of manufacturing. Forming sheath 32 in two portions and using two mandrels is for example purposes only, and in other embodiments, sheath 32 could be formed in fewer or more portions.

While the invention has been discussed in relation to making sheath 32 for airfoil 34, method 52 can be adapted to make other kinds of leading edge protection components or structures. For example, leading edge protection components for rotor or propeller blades could be formed using a cold spray process with only one or more mandrels. Additionally, while FIGS. 3A-3C show the use of first and second mandrels and a support base, only one mandrel could be used, or an embodiment could use one mandrel with multiple portions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a leading edge protection component, the method comprising:
   depositing particles using a cold spray process on a first mandrel to form a first portion of the leading edge protection component;
   placing a second mandrel on the first portion of the leading edge protection component;
   depositing particles using the cold spray process to form a second portion of the leading edge protection component on the second mandrel; and
   removing the leading edge protection component from the second mandrel.

2. The method of claim 1, wherein the step of forming the second portion of the leading edge protection component by depositing particles on the second mandrel using a cold spray process further comprises:
   using a support base to hold the first portion of the leading edge protection component while forming the second portion.

3. The method of claim 1, wherein the first and/or second mandrel includes a surface release layer.

4. The method of claim 3, wherein the second mandrel includes the release layer and wherein the step of removing the leading edge protection component from the second mandrel comprises:
   heating the second mandrel and the leading edge protection component so that the release layer melts to allow the leading edge protection component to release from the second mandrel.

5. The method of claim 1, wherein the leading edge protection component is a leading edge sheath.

6. The method of claim 5, wherein the second mandrel is shaped like a blade to which the sheath will attach.

7. The method of claim 1, wherein the cold spray process comprises:
   accelerating powdered metal or cermet particles at very high velocities using a gas; and
   directing the particles at one of the first mandrel and the second mandrel.

8. The method of claim 7, wherein the metal or cermet particles are a mixture of one or more of: nickel, nickel alloys, titanium, titanium alloys, aluminum, aluminum alloys, iron, iron alloys, ceramic, diamond, cbn, WC, TiC, and Cr3C2.

9. The method of claim 7, wherein the cold spray process forms successive layers with different materials.

10. The method of claim 9, wherein a first layer of the successive layers comprises particles with properties of high strength and impact resistance and a second layer of the successive layers comprises particles with high hardness and erosion resistance properties.

11. A method of forming a blade with a sheath, the method comprising:
   fabricating an airfoil with a tip, root, leading edge and trailing edge;
   forming a sheath on a first mandrel by depositing particles using a cold spray process to form a first portion of the sheath on the first mandrel;
   removing the first portion from the first mandrel;
   placing the first portion on a support base;
   placing a second mandrel on the first portion;
   depositing particles using a cold spray process to form a second portion of the sheath on the second mandrel;
   removing the sheath from the second mandrel and the support base; and
   bonding the sheath to the leading edge of the airfoil.

12. The method of claim 11, wherein the first mandrel and the second mandrel each have a surface release layer.

13. The method of claim 12, wherein the step of removing the first portion of the sheath from the first mandrel comprises:
   heating the first mandrel and the first portion of the sheath so that the release layer melts to allow the first portion of the sheath to release from the first mandrel.

14. The method of claim 12, wherein the step of removing the sheath from the second mandrel comprises:
   heating the second mandrel and the sheath so that the release layer melts to allow the sheath to release from the second mandrel.

15. The method of claim 11, wherein the step of bonding the sheath to the leading edge of the airfoil further comprises:
   inserting a skrim sheet between the sheath and the airfoil; and
   adhesively bonding the sheath to the airfoil.

16. A high density sheath for an airfoil with a leading edge, a trailing edge, a suction side and a pressure side, the sheath comprising:
   a central portion configured to attach to the leading edge;
   a first flank configured to attach to the suction side of the airfoil; and
   a second flank configured to attach to the pressure side of the airfoil,
   wherein the high density sheath is formed by:
      depositing particles using a cold spray process to form a first portion of the sheath on the first mandrel;
      removing the first portion from the first mandrel;
      placing the first portion on a support base;
      placing a second mandrel on the first portion;
      depositing particles using the cold spray process to form a second portion of the sheath on the second mandrel; and
      removing the sheath from the second mandrel and the support base.

* * * * *